Figure 1:
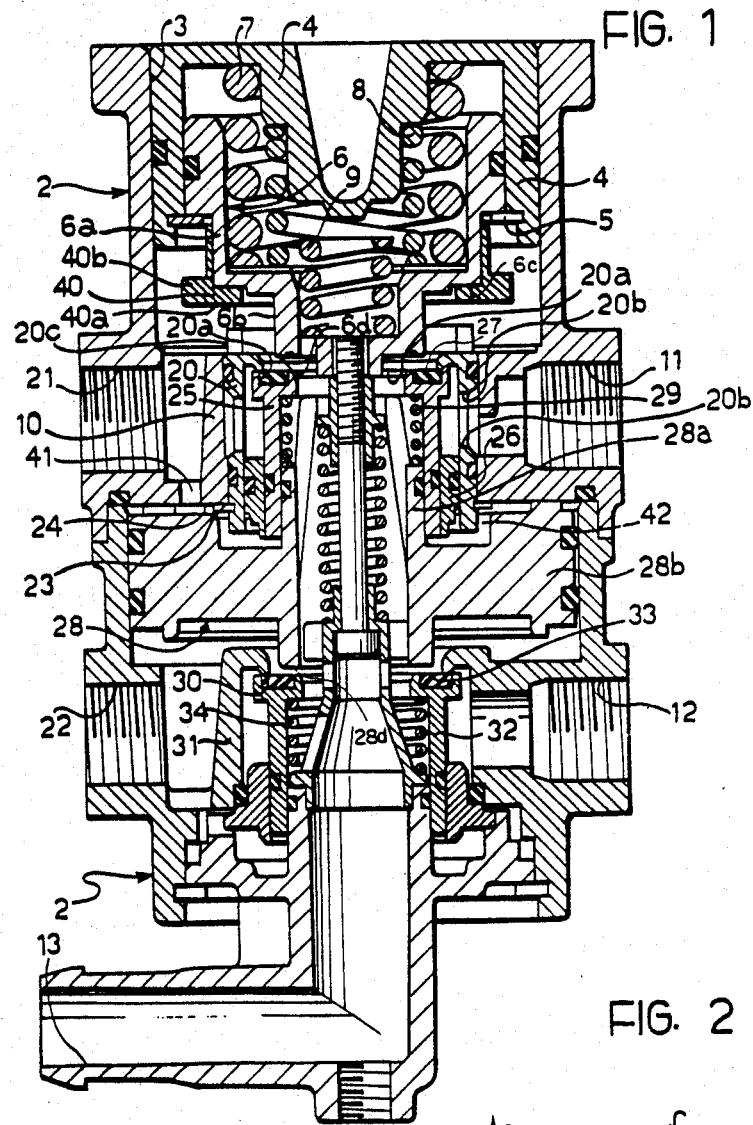

United States Patent [19]

Angelillo

[11] Patent Number: 4,822,110
[45] Date of Patent: Apr. 18, 1989

[54] PNEUMATIC VALVE, PARTICULARLY A DUPLEX-TYPE DISTRIBUTOR FOR A BRAKING SYSTEM, INCLUDING A DEVICE FOR LIMITING THE MAXIMUM DISTRIBUTABLE PRESSURE

[75] Inventor: Domenico Angelillo, Sesto S.Giovanni, Italy

[73] Assignee: Industrie Magneti Marelli S.r.L., Milan, Italy

[21] Appl. No.: 138,126

[22] Filed: Dec. 28, 1987

[30] Foreign Application Priority Data

Dec. 30, 1986 [IT]  Italy ................. 67996 A/86

[51] Int. Cl.4 ............................................. B60T 15/06
[52] U.S. Cl. ........................................ 303/56; 303/52
[58] Field of Search .................... 303/40, 52, 54, 56

[56] References Cited

U.S. PATENT DOCUMENTS 3,355,223  11/1967  Klimek ................................. 303/52
3,449,020  6/1969  Klimek ................................. 303/52

Primary Examiner—Duane A. Reger
Attorney, Agent, or Firm—Sughrue, Mion, Zinn, Macpeak & Seas

[57] ABSTRACT

In its simplest form, the valve comprises a body with an inlet connector and an outlet connector intended to be connected to a pressure source and a pneumatic circuit respectively. In the body, a valve comprising a seat and an obturator controls communication between the connectors. A control piston is sealingly slidably mounted in the body and, in its working travel, can cause controlled movement of the obturator away from the seat to cause controlled opening of the valve. According to the invention, the seat of the valve is formed in a member mounted in the body for movement in the direction of displacement of the obturator. A member is operatively associated with the piston and intended to cause a displacement of the seat relative to the body together with and in contact with the obturator when the control piston passes beyond a predetermined position relative to the body in its working travel.

1 Claim, 1 Drawing Sheet

PNEUMATIC VALVE, PARTICULARLY A DUPLEX-TYPE DISTRIBUTOR FOR A BRAKING SYSTEM, INCLUDING A DEVICE FOR LIMITING THE MAXIMUM DISTRIBUTABLE PRESSURE

DESCRIPTION

The present invention relates to a pneumatic valve, particularly for use in a braking system, comprising a body with an inlet connector and an outlet connector intended to be connected to a pressure source and a pneumatic circuit respectively, and having a valve comprising a seat and an obturator for controlling communication between the connectors, a control device including a piston sealingly slidably mounted in a guide portion of the body and able to cause in its working travel a controlled displacement of the obturator away from the seat, so as to cause controlled opening of the valve, and means for limiting the maximum pressure deliverable through the outlet connector.

Figure 2:
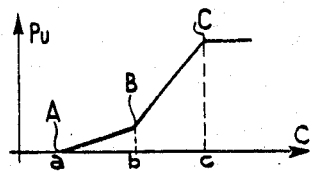

The pneumatic valve according to the invention is characterised in that the valve seat is formed in a member mounted in the body for translation in the direction of displacement of the obturator, and in that the pressure limiting means comprise control means operatively associated with the piston and arranged to cause displacement of the seat relative to the body together with and in contact with the obturator when the piston passes beyond a predetermined position relative to the body in its working travel. Further characteristics and advantages of the invention will become clear from the detailed description which follows with reference to the appended drawings, provided purely by way of non-limiting example, in which:

FIG. 1 is a sectional view of a two-sectioned (duplex) distributor for a motor vehicle braking system with two independent circuits, produced according to the present invention, and FIG. 2 is a graph showing the characteristic trace which indicates the law of variation of the pressure distributed to an outlet of the distributor of FIG. 1, as a function of the travel of a control member of the distributor.

With reference to the drawing, a duplex-type pneumatic distributor, generally indicated 1, comprises a body 2 having an opening 3 at the top, in which a tubular control member 4 with a rod-shaped central portion is translatably mounted. The lower end of the tubular element 4 has an internal circumferential groove in which is inserted a stop ring 5 projecting radially towards the axis of this element.

A substantially cup-shaped piston, indicated 6, is sealingly mounted within the tubular element 4 for axial translation, with the interposition of helical springs 7 and 8. These springs bias the piston 6 into abutment with the stop ring 5.

A further helical spring, indicated 9, is interposed between the rod-shaped portion of the tubular member 4 and the base wall of the piston 5. This spring is normally extended and can be compressed only as a result of a relative displacement of the piston 6 towards the inside of the tubular element 4, and thus before compression of the springs 7 and 8.

In the embodiment illustrated, the portion 6a of the piston 6 projecting downwards beyond the stop ring 5 has a smaller diameter than the portion which is slidable in the tubular member 4. This portion 6a of the piston has a central axial extension 6b which extends downwardly and has a still smaller outside diameter. An annular shoulder 6c lying in a plane perpendicular to the axis of the piston is defined between the portions 6a and 6b of the piston.

The body 2 is formed with two inlet connectors 11 and 12 and on its opposite side corresponding outlet connectors 21 and 22. The connectors 11 and 12 are intended to be connected to two pressure reservoirs, while the connectors 21 and 22 are intended to be connected to two independent braking circuits of a motor vehicle, for example, the front and rear braking circuits.

At its lower end, the body 2 is also provided with an exhaust connector 13 which is bent through 90° in the embodiment illustrated.

In the region below the control piston 6, between the connectors 11 and 21, the body 2 forms a tubular wall 10 coaxial with the control piston 6 and connected to the inlet connector 11. A tubular member 20, whose upper end forms a rim 20a turned towards the axis and able to act as a valve seat, is sealingly slidably mounted in this tubular wall. At its lower end, the tubular member 20 has a circumferential groove in which is inserted a stop ring 23 able to interfere with a shoulder 24 formed by the wall 10 of the body 2, thus limiting the upward displacement of the tubular member 20, relative to the body 2. The side wall of the member 20 is formed with apertures 20b at least one of which faces the inlet connector 11.

The lower axial portion of the member 20 has a smaller cross-section than the section of the upper axial portion.

A tubular obturator, indicated 25, is sealingly slidably mounted in the member 20 with the interposition of an intermediate ring 26. The obturator 25 carries at its upper end an annular washer 27 which cooperates with the valve seat 20a.

A control piston, generally indicated 28, is slidably mounted in the portion of the body 2 between the connectors 11, 21 and 12, 22. This piston comprises a tubular hub 28a sealingly slidably mounted within the obturator 25. A disc portion 28b, sealingly slidably mounted against the wall of the body 2, extends radially outwardly from this tubular portion of the piston 28.

A helical spring 29 is interposed between the top of the tubular portion 28a of the piston 28 and a shoulder formed in the upper portion of the obturator 25.

A second valve, which comprises a seat 30 formed in a tubular wall 31 and is connected to the inlet connector 12 and a tubular actuator 32 translatable along the axis of the pistons 6 and 28, is formed in the portion of the body 2 below the piston 28, between the inlet connector 12 and the outlet connector 22. This obturator carries an annular washer 33 cooperating with the valve seat 30. A helical spring 34 biases the obturator 32 against the seat 30.

The end portion 6b of the piston 6 has a lower annular rim 6d which can act as a valve seat and cooperate with the washer 27 of the obturator 25 to disconnect the outlet connector 21 from the exhaust connector during braking.

Similarly, the tubular hub 28a of the piston 28 has a lower rim 28d which can act as a valve seat and cooperate with the washer 33 of the obturator 32 to disconnect the outlet connector 22 from the exhaust connector 13 during braking.

An annular element, indicated 40, is located around the portion 6a of the control piston 6. This annular element has an annular projection 40a which extends radially inwardly and a projection 40b which extends radially outwardly. In the rest condition illustrated in FIG. 1, the projection 40a is in contact with the shoulder 6c of the control piston 6. The projection 40b faces but is relatively spaced from the ring 5 carried by the piston 4.

The tubular element 20 forming the valve seat 20a has a plurality of upper projections 20c which, in the rest condition of the distributor illustrated in FIG. 1, project axially beyond the upper edge of the tubular wall 10 of the body, facing and spaced from the projection 40a of the annular element 40.

A passage 41 puts the outlet connector 21 into communication with a chamber 42 above the disc portion 28b of the piston 28.

The distributor illustrated in FIG. 1 operates in a manner which will now be described with reference to the graph of FIG. 2 which shows the changes in the pressure Pu supplied at the outlet of the distributor (for example, at the outlet 11) as a function of the travel C of the control piston 4.

In known manner, operation of the brake pedal causes the piston 4 to move downwards and, by means of the springs 7 and 8, this causes the control piston 6 to move downwards until the seat 6d comes into contact with the washer of the obturator 25. The travel necessary to reach this condition is represented by the travel from the origin of the graph of FIG. 2 to the point indicated A. Further downward movement of the piston 4 causes compression of the springs 7 and 8 and further downward movement of the piston 6, causing the obturator 25 to move away from the seat 20a which remains stationary. The inlet connector 11 is connected to the outlet connector 21 and compressed air is supplied to the first braking circuit of the vehicle through the open valve 20a, 25. Compressed air also enters the chamber 42 and acts on the upper face of the piston 28. The latter descends until the seat 28d engages the obturator 32 and moves it away from the seat 30, causing compressed air to flow into the second braking circuit of the vehicle through the outlet connector 22 which is connected to the inlet connector 12.

When the force acting on the pistons 6 and 28 as a result of the air pressure supplied to the braking circuits balances the forces biasing these pistons downwards, the valves 20a–27 and 28d–32 close.

For values of the travel C between the values indicated a and b in FIG. 2, the output pressure Pu assumes values which lie on a straight-line A-B whose slope depends on the characteristics of the springs 7 and 8.

The point B of the characteristic trace shown in FIG. 2 corresponds to the position in which the piston 4 reaches the upper end of the helical spring 9 and starts to compress it. From this position, there is a greater increase in pressure distributed for the same variation of distance travelled; the trace thus has a straight portion between points B and C of FIG. 2. The slope of this portion depends on the characteristics of the springs 7 to 9.

In the portion of the characteristic trace between points B and C, the ring 5 carried by the piston 4 progressively approaches the projection 40b of the annular element 40 located around the piston 6. The ring 5 is thus brought into abutment with the projection of the ring 40 and causes the further approach of the latter towards the projections 20c of the tubular member 20 in which the valve seat 20a is formed. The ring 40, with its projection 40a, is brought into contact with the projections 20c in correspondence with point C of the trace shown in FIG. 2. Up to this time, the annular member 20 remained in the position illustrated in FIG. 1, even when the obturator 25 moved down; this member presents a greater area to the pressure biasing it upwards. Further descent of the piston 4 causes further downward movement of the tubular obturator 25 and, by means of the ring 40, corresponding downward movement of the annular member 20 in which the seat 20a is formed, together with and in contact with the obturator. This seat and the associated obturator are thus moved downwards by the same amount. The characteristic trace of FIG. 2 thus has a final horizontal straight-line portion. In other words, the pressure Pu is automatically limited to a predetermined value, for example 7.5 bars, for any further increase in value of the travel of the piston 4.

I claim:

1. A pneumatic valve, particularly for braking systems, comprising a body with an inlet connector and an outlet connector intended to be connected to a pressure source and a pneumatic circuit respectively, and having a valve comprising a seat and an obturator for controlling communication between the said connectors, a control device including a piston sealingly slidably mounted in a guide portion of the body and able to cause a controlled displacement of the obturator away from the seat in its working travel, so as to cause controlled opening of the valve, and means for limiting the maximum pressure deliverable to the outlet connector; wherein the seat is formed in a member mounted in the body for translation in the direction of displacement of the obturator, and the limiting means comprise control means operatively associated with the piston and arranged to cause a displacement of the seat relative to the body together with and in contact with the obturator when the piston passes beyond a predetermined position relative to the body in its working travel.

* * * * *